United States Patent [19]

Nolin et al.

[11] Patent Number: 5,759,505
[45] Date of Patent: Jun. 2, 1998

[54] METHOD AND DEVICE FOR REMOVING SULPHUR DIOXIDE FROM A GAS

[75] Inventors: Kjell Nolin, Asarum; Lars-Erik Johansson, Älmedboda; Mati Maripuu, Växjö; Sune Bengtsson, Väsjö; Leif Lindberg, Växjö, all of Sweden

[73] Assignee: ABB Fläkt Industri AB, Växjö, Sweden

[21] Appl. No.: 750,866

[22] PCT Filed: Apr. 13, 1995

[86] PCT No.: PCT/SE95/00404

§ 371 Date: Jan. 27, 1997

§ 102(e) Date: Jan. 27, 1997

[87] PCT Pub. No.: WO96/00122

PCT Pub. Date: Jan. 4, 1996

[30] Foreign Application Priority Data

Jun. 23, 1994 [SE] Sweden ............................ 9402218

[51] Int. Cl.⁶ .................... B01D 53/50; B01J 10/00
[52] U.S. Cl. .................... 423/243.08; 55/225; 55/233; 55/240; 422/168; 422/176; 422/227
[58] Field of Search .................. 423/243.08; 422/227, 422/176, 168, 110; 55/225, 233, 240; 95/36

[56] References Cited

U.S. PATENT DOCUMENTS

| | | | |
|---|---|---|---|
| 1,565,366 | 12/1925 | Howard | 422/227 |
| 4,239,515 | 12/1980 | Yanagioka et al. | 55/223 |
| 4,263,021 | 4/1981 | Downs et al. | 55/73 |
| 5,246,471 | 9/1993 | Bhat et al. | 55/223 |

FOREIGN PATENT DOCUMENTS

| | | |
|---|---|---|
| 0 162 536 A1 | 11/1985 | European Pat. Off. . |
| 357599 | 9/1931 | Germany . |
| 34 10109 C2 | 8/1987 | Germany . |
| WO 94/29003 | 12/1994 | WIPO . |

*Primary Examiner*—Gary P. Straub
*Assistant Examiner*—Timothy C. Vanoy
*Attorney, Agent, or Firm*—Burns, Doane, Swecker & Mathis, L.L.P.

[57] ABSTRACT

A method and a device for removing sulphur dioxide from a gas, preferably a flue gas, by means of an aqueous suspension of an absorbent, preferably limestone, are disclosed. In the method, the flue gas is conducted through a conduit topped with an apertured plate (3) on which is provided a flowing layer of the absorbent suspension having a static height of at least about 100 mm. preferably about 200–500 mm. and a volume of about 50–500 l. calculated per m³ of flue gas flowing through the layer every second. The layer of absorbent suspension flows along the apertured plate (3) at a flow rate of about 5–100 l/s, preferably about 10–30 l/s per 1 m³ of sulphur-dioxide-containing gas per second. The device comprises an inlet (1) and an outlet (2) for the flue gas; an apertured plate (3); a tank (5) for the absorbent suspension; at least one inlet duct (6) arranged between the tank (5) and the apertured plate (3); means (8, 10, 11, 12) for supplying the absorbent suspension; at least one outlet duct (7) for recycling the absorbent suspension from the apertured plate (3) to the tank (5); and means (9, 12; 13; 14; 16) for supplying air, absorbent and water, as well as for withdrawing gypsum.

23 Claims, 2 Drawing Sheets

METHOD AND DEVICE FOR REMOVING SULPHUR DIOXIDE FROM A GAS

This application is a national stage filing under 35USC371 of PCT/SE95/00404 filed Apr. 13, 1995.

FIELD OF THE INVENTION

This invention relates to a method and a device for removing sulphur dioxide from a gas, such as a flue gas, by means of an aqueous suspension of an absorbent selected from lime and limestone.

BACKGROUND OF THE INVENTION

Gaseous sulphur dioxide is formed upon the oxidation of sulphur-containing material, such as refuse, coal, oil, natural gas and peat. Even though this invention is especially concerned with the removal of sulphur dioxide from flue gases generated by the oxidation (combustion) of such material, for instance flue gases from oil-fired power stations, it is by no means restricted thereto, but relates to the cleaning of sulphur-dioxide-containing gases in general. Such cleaning is previously known and is generally based on the sulphur dioxide being absorbed in an aqueous washing liquid. At present, use is chiefly made of three different systems for cleaning sulphur-dioxide-containing flue gases, namely calcium-based systems, sodium-based systems and indirect calcium-based systems. In the calcium-based systems, limestone ($CaCO_3$) and lime ($CaO$, $Ca(OH)_2$) are used as alkali, whereas in the sodium-based systems, sodium hydroxide ($NaOH$) or soda ($Na_2CO_3$) is used as alkali. In the indirect calcium-based systems, a readily-soluble alkali, such as $NaOH$, is used for primarily absorbing the sulphur dioxide in a gas washer. Having absorbed sulphur dioxide, the washing liquid is regenerated outside the gas washer by means of a more sparingly-soluble alkali, such as lime.

This invention concerns a calcium-based system, in which limestone or lime is used as alkali.

Prior-art calcium-based systems of this type include a washing tower, in most cases a spray tower, into which flue gas is introduced and treated countercurrently with an injected suspension of fine-grained limestone or lime as absorbent. When contacted with the finely-divided absorbent suspension, the sulphur dioxide is absorbed to form, after oxidation, gypsum ($CaSO_4.2H_2O$) with the absorbent. The flue gas thus rid of sulphur dioxide then leaves the spray tower. In order to bring about the required oxidation and gypsum formation, oxygen-containing gas, such as air, is injected into the absorbent suspension, usually in the tank employed as storage means and for recycling of the absorbent suspension. As a rule, large suspension flows are recycled through the spray tower, and the storage tank contains a very large volume of absorbent suspension. As an example, it may be mentioned that the suspension volume in installations for flue-gas cleaning in power stations may exceed 1000 $m^3$, and volumes of up to 6000 $m^3$ occur. Such large volumes are seen as necessary in order to efficiently use the oxygen-containing gas supplied, since the solubility of oxygen increases with the depth at which it is injected. Furthermore, a considerable volume of absorbent suspension is regarded as necessary in order that the absorbent supplied should have a sufficient holding time to be dissolved. Also, a long holding time is needed if the precipitated gypsum crystals are to grow and become easy to filter off. The holding time of the recycled suspension typically is in the range of 6-12 min, while the holding time of the formed gypsum often is about 20-30 h. It should further be emphasised that washing towers of the above type are large constructions, the difference in height between the storage tank for the absorbent suspension and the spray nozzles being about 20-40 m. Also, the pressure in the spray nozzles corresponds to a liquid column of about 10 m. This means that considerable amounts of energy are required for lifting and recycling the absorbent suspension to the nozzles and for feeding the suspension countercurrently to the flue gas.

EP 0 162 536 and DE 34 10 109 may be mentioned as instances of background art as regards the removal of sulphur dioxide from process gases on the basis of countercurrent contact between the gas and the absorbent suspension, the absorbent suspension being pumped to a great height, which requires a substantial energy consumption, in order to be spread countercurrently to the gas by means of nozzles.

Apart from spray towers of the above type, the prior art encompasses the use of packed towers and towers with plates, such as sieve-plate columns, for removing sulphur dioxide from flue gases. Thus, U.S. Pat. Nos. 5,263,021 and 5,246,471 disclose towers equipped with sieve plates or sieve trays. However, these patent specifications teach a technique according to which the liquid has to be pumped to a great height, which requires a substantial energy consumption, in order to be spread countercurrently to the flue gas. The absorbent suspension then flows through the holes in the sieve plates and is thus transported to the bottom of the tower.

A further instance of the prior art is disclosed in GB 357,599, which relates to a method and an apparatus for treating liquids with gases. However, the patent specification does not disclose the removal of sulphur dioxide from a gas, such as a flue gas, with the aid of an aqueous suspension of an absorbent selected from lime and limestone.

Apart from being highly energy-intensive, the prior-art countercurrent technique involves bulky constructions and huge volumes of absorbent suspension. Thus, it would be advantageous to provide a method and a device enabling a high degree of absorption of sulphur dioxide, an efficient utilisation of the absorbent, and a low hydrogensulphite-ion and sulphite-ion concentration in the absorbent suspension (i.e. a low risk of unwanted precipitation of calcium sulphite), involving a low energy consumption and requiring a comparatively small volume of absorbent suspension while enabling a relatively compact design.

DESCRIPTION OF THE INVENTION

The invention achieves this aim by providing a method which combines a number of essential measures and can be carried out with the aid of a special well-defined device, as will be described in more detail below. According to the invention, the gas to be cleaned in an absorbent suspension is more specifically finely divided, and the gas and the absorbent suspension are supplied in cross-flow in relation to each other. Since the absorbent suspension has no or but a small lifting height from the storage to the zone where it is contacted with the gas, the amount of energy required for feeding the suspension is minimised.

Further characteristics of the invention are recited in the appended claims.

Thus, the invention provides a method for removing sulphur dioxide from a gas, such as a flue gas, by means of an aqueous suspension of an absorbent selected from lime and limestone, characterised in that the sulphur-dioxide-containing gas is conducted upwards through an apertured plate on which is provided a flowing layer of the absorbent suspension, said layer having a static height of at least about 100 mm and a static volume of about 50–500 l, calculated per m³ of sulphur-dioxide-containing gas flowing through the layer every second, and that the layer of absorbent suspension flows along the apertured plate at a flow rate of about 5–100 l/s, calculated on the static volume through which flows 1 m³ of sulphur-dioxide-containing gas per second.

The invention further provides a device for removing sulphur dioxide from a gas, such as a flue gas, by means of an aqueous suspension of an absorbent selected from lime and limestone, characterised in that it comprises a) an inlet for sulphur-dioxide-containing gas, and an outlet for gas from which sulphur dioxide has been removed, b) an apertured plate provided between the inlet and the outlet to permit the passage of sulphur-dioxide-containing gas from below, and to carry thereon a flowing layer of the absorbent suspension having a static height of at least about 100 mm and a static volume of about 50–500 l, calculated per m³ of sulphur-dioxide-containing gas flowing through the layer every second, c) a tank for the absorbent suspension, d) at least one inlet duct connecting the tank to the upper side of the apertured plate, e) means for feeding absorbent suspension from the tank, through the inlet duct, to the upper side of the apertured plate and along said plate at a flow rate of about 5–100 l/s, calculated on the static volume through which flows 1 m³ of sulphur-dioxide-containing gas per second, f) at least one outlet duct connecting the upper side of the apertured plate to the tank for recycling the absorbent suspension to the tank, g) means for supplying an oxygen-containing gas, h) means for supplying absorbent, i) means for supplying water, and j) means for withdrawing gypsum.

In the inventive method, it is preferred that the static (unexpanded) height of the layer of absorbent suspension is about 200–500 mm, and that the layer of absorbent suspension flows along the apertured plate at a flow rate of about 10–50 l/s. It is furthermore preferable that the absorbent suspension contains about 5–20% by weight, preferably about 10–15% by weight, of gypsum crystals.

In the inventive device, it is preferred that the means e) comprises impeller disposed in the lower region of each outlet duct. Furthermore, it is preferable that the means g) comprises a nozzle adapted to supply oxygen-containing gas and disposed downstream from the impeller in each outlet duct. It is especially preferred that the device has an essentially circular cross-section and is provided with a centrally-arranged, upward inlet duct of circular cross-section. In this context, it is preferred that the outlet duct or ducts are arranged at the periphery of the device and that they connect the upper side of the apertured plate to the tank. Furthermore, the apertured plate preferably has a free aperture area of about 1–20%, more preferred about 1–10%, and most preferred about 3–5%. Furthermore, it is preferred that the apertured plate has apertures, whose edges are rounded on the underside, having a radius of curvature of about 5–50 mm.

These and other distinctive features of the invention will appear in more detail from the following description.

The invention is especially distinguished by the fact that the sulphur-dioxide-containing gas is fed upwards through an apertured plate and a layer of absorbent suspension provided on the plate and being continuously supplied with essentially sulphite-free absorbent suspension in a sufficient amount to react with the sulphate to form gypsum ($CaSO_4.2H_2O$). The layer of absorbent suspension flows transversely over the apertured plate at such a flow rate that the spent absorbent suspension is removed and enough fresh absorbent suspension is supplied for the absorption of sulphur dioxide from the upwards-flowing, sulphur-dioxide-containing gas.

The sulphite-ion concentration of the absorbent suspension is reduced by the oxidation of absorbed sulphur dioxide, which diminishes the risk of deposits, since the degree of saturation of sulphite is thus reduced. Another favourable effect ensuing from the reduced sulphite-ion concentration is the reduction in the equilibrium-vapour pressure for sulphur dioxide over the suspension, enabling a higher degree of separation for sulphur dioxide. Also, the reduced sulphite-ion concentration promotes the dissolution of absorbent (lime). In order that all the sulphur dioxide absorbed should be oxidised, the absorbent suspension is supplied with such amounts of oxygen that the molar ratio of oxygen to sulphur dioxide is at least about 0.5:1 and preferably ranges from about 0.5:1 to about 25:1.

Likewise, the absorbent suspension should have such a content of calcium-based absorbent (lime or limestone) that all the sulphate in the absorbent suspension can be precipitated in the form of gypsum. Provided that all the sulphur dioxide absorbed is converted to sulphate, the amount of calcium-based absorbent in the suspension should be at least equimolar, and preferably slightly higher than that. Conveniently, the molar ratio of calcium-based absorbent to sulphur dioxide ranges from about 1:1 to about 1:1.10, and preferably is about 1:1.05 at the most. In order to promote solubility, the calcium-based absorbent is preferably supplied in the form of a fine-grained powder, preferably having a particle size of about 20–100 μm, at least about 96% of the particles being smaller than about 44 μm. Preferably, the calcium-based powder is supplied to the process in the form of a water slurry having a concentration of about 20–35% by weight. However, the powder may also be supplied in dry state by injection below the apertured plate or into the bed.

The flow of sulphur-dioxide-containing gas conducted upwards through the apertured plate and the layer of absorbent suspension should be such that there is good contact between the suspension and the gas. To this end, the contact time and the contact surface should be maximised. The contact time increases as the velocity of the gas decreases and as the height of the suspension layer increases. The velocity of the gas is affected by the open area or aperture area of the apertured plate, i.e. the number of apertures and their dimensions. Thus, the velocity of the gas decreases as the aperture area increases. According to the invention, the free aperture area of the apertured plate preferably is about 1–20%, more preferred about 1–10%, and most preferred about 3–5%. In order to achieve good contact between the suspension and the gas, the gas flow should, moreover, be such that turbulence is generated in the suspension layer.

Even though a low velocity of the gas increases the time of contact between the suspension layer and the gas and reduces the pressure drop over the apertured plate, the velocity of the gas must not be too low, since the absorbent suspension begins to "leak" through the apertured plate, i.e. flows down through the apertures in the plate, when the velocity of the gas goes below a certain level. According to the invention, the gas flow through the layer of absorbent suspension should be such that its lower limit results in a pressure difference over the apertured plate and the layer that is somewhat higher than the static (unexpanded) height of the layer. The invention allows a certain minor leakage, such that the velocity of the gas flowing through the apertured plate is, at the lower limit where there is a certain leakage, about ⅔ of the velocity at which the leakage ceases. There is no clear, critical upper limit for the gas flow, but if the gas flow increases too much, the absorbent suspension will be entrained by the gas flow and leave with the departing gas. If the gas flow is kept within these limits, one may achieve a state in which the suspension layer is retained on the apertured plate while good contact between the suspension and the gas is ensured. In general, the velocity of the gas flow is about 20–60 m/s, preferably about 35–50 m/s, measured as the velocity of the gas flowing through the apertures of the plate.

The contact between the sulphur-dioxide-containing gas and the absorbent suspension is also affected by the static (unexpanded) height of the layer of absorbent suspension. Thus, the higher the layer, the better the contact, as a result of the prolonged contact time. According to the invention, a lower limit for the height of the layer is at least about 100 mm. Below this height, the layer is too thin to enable satisfactory contact between the suspension and the gas and, hence, a high degree of $SO_2$ separation. There is no critical upper limit for the height of the layer, but it has, according to the invention, been found that a height above about 500 mm involves high energy costs while not entailing any further advantages of any importance as regards the separation of sulphur dioxide. According to the invention, it has also been found that the static height of the layer of absorbent suspension preferably is at least about 200 mm, if optimum results are to be obtained. Consequently, it is preferred that the static height of the layer of absorbent suspension is about 200–500 mm.

As emphasised in the foregoing, the static (unexpanded) volume of absorbent suspension on the apertured plate through which flows 1 $m^3$ of sulphur-dioxide-containing gas per second is a characteristic parameter of the invention. The static volume is affected by the static height and the surface of the suspension layer. Thus, the smaller the volume, the more effective the method. According to the invention, the static volume is, as mentioned above, about 50–500 l, preferably about 200–300 l. With a volume below about 50 l, the absorption of sulphur dioxide is unsatisfactory, whereas a volume exceeding about 500 l does not entail any further advantages.

It has furthermore been found that a replenishment of the bubble bed is required in order to keep down the $HSO_3^-$ concentration, which gives rise to such an equilibrium pressure of $SO_2$ as impairs the $SO_2$ absorption. This is due to the fact that the oxidation, i.e. the conversion of $HSO_3^-$ to sulphate and hydrogen ions, is not fast enough. The suspension flow that thus has to be supplied to and drawn off from the bubble bed depends on the $SO_2$ content of the gas, the oxidation achieved and the aimed-at degree of cleaning as regards $SO_2$.

Therefore, it is essential in the invention that the layer of absorbent suspension on the apertured plate is not static or stationary but flows over the surface of the apertured plate in a flow transverse to the upwards-flowing, sulphur-dioxide-containing gas. To be more precise, the absorbent suspension according to the invention flows along the apertured plate at a flow rate of about 5–100 l/s, preferably about 10–50 l/s, calculated on the static volume of absorbent suspension through which flows 1 $m^3$ of sulphur-dioxide-containing gas per second. This parameter is referred to as L/G (Liquid/ Gas). The suspension flows from an inlet for fresh absorbent suspension, i.e. absorbent suspension that has been supplied with oxygen and calcium-based absorbent so as to be capable of absorbing sulphur dioxide, to an outlet for spent absorbent suspension, i.e. absorbent suspension that has absorbed sulphur dioxide and thus spent calcium-based absorbent in order to convert absorbed sulphur dioxide to gypsum. Thus, the fact that the absorbent suspension flows in the horizontal direction over the apertured plate according to the invention results in the sulphur-dioxide-containing gas being at all times contacted with fresh absorbent suspension capable of absorbing the sulphur dioxide content of the gas. At the same time, there is, of course, a considerable amount of back-mixing, owing to the turbulent movements of the layer when the gas is conducted through the apertured plate. The amount of backmixing depends on the geometry and the selected flow rates in each specific case.

In order to optimise the method according to the invention, including the dissolution of calcium-based absorbent and oxygen in the suspension, the absorption of sulphur dioxide as sulphite or hydrogen sulphite, the oxidation of sulphite and hydrogen sulphite to sulphate, and the precipitation of sulphate in the form of gypsum, the pH of the suspension should be in the range of about 3.0–5.5, preferably about 3.5–5.0. As a rule, this does not create any major problems in the invention. In order to further improve the function, increase the separation of $SO_2$ and reduce the risk of undesirable precipitation of incrustations, a suitable pH can be stabilised with the aid of a buffer. There are various known buffers, such as organic acids, inorganic acids, and organic amines, which may be selected by the expert, there being no need of any extensive enumeration here. However, it may be mentioned that suitable buffers include monocarboxylic acids, such as formic acid, acetic acid and propionic acid; polycarboxylic acids, such as succinic acid, adipic acid, phthalic acid, isophthalic acid, and citric acid; hydroxy-substituted acids, such as glycolic acid and lactic acid; and sulphocarboxylic acids, such as sulphopropionic acid and sulphosuccinic acid. Amongst these buffers, adipic acid, lactic acid, sulphopropionic acid and sulphosuccinic acid are of special interest. According to the invention, the buffer added preferably is a weak organic acid having a pKa in the range of 3–5, especially adipic acid. The buffer is added in the amount required to stabilise the pH of the absorbent suspension at the interfaces as well as in the main body of the layer to about 3.0–5.5. In general, the amount of buffer added is about 100–5000 ppm, preferably about 500–2500 ppm.

The risk of incrustations mentioned above can be minimised in various ways. The precipitation of calcium sulphite is effectively prevented by the acid pH range selected. Incrustation caused by gypsum precipitation is prevented by having the absorbent suspension contain about 5–20% by weight, preferably about 10–15% by weight, and most preferred about 12% by weight, of gypsum crystals as seed particles. Thus, gypsum will crystallise selectively on the gypsum crystals instead of on the equipment surfaces.

BRIEF DESCRIPTION OF THE DRAWINGS

The method and the device according to the invention will now be described in more detail with reference to the accompanying drawings, in which.

Figure 1:
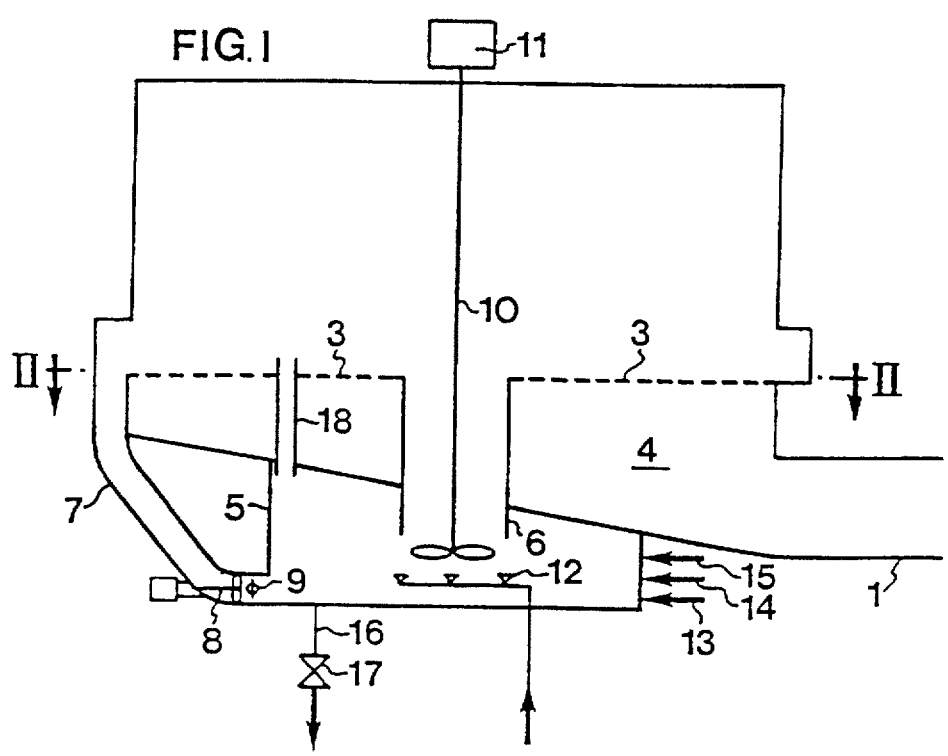
FIG. 1 is a lateral section of a preferred embodiment of the inventive device.
Figure 2:
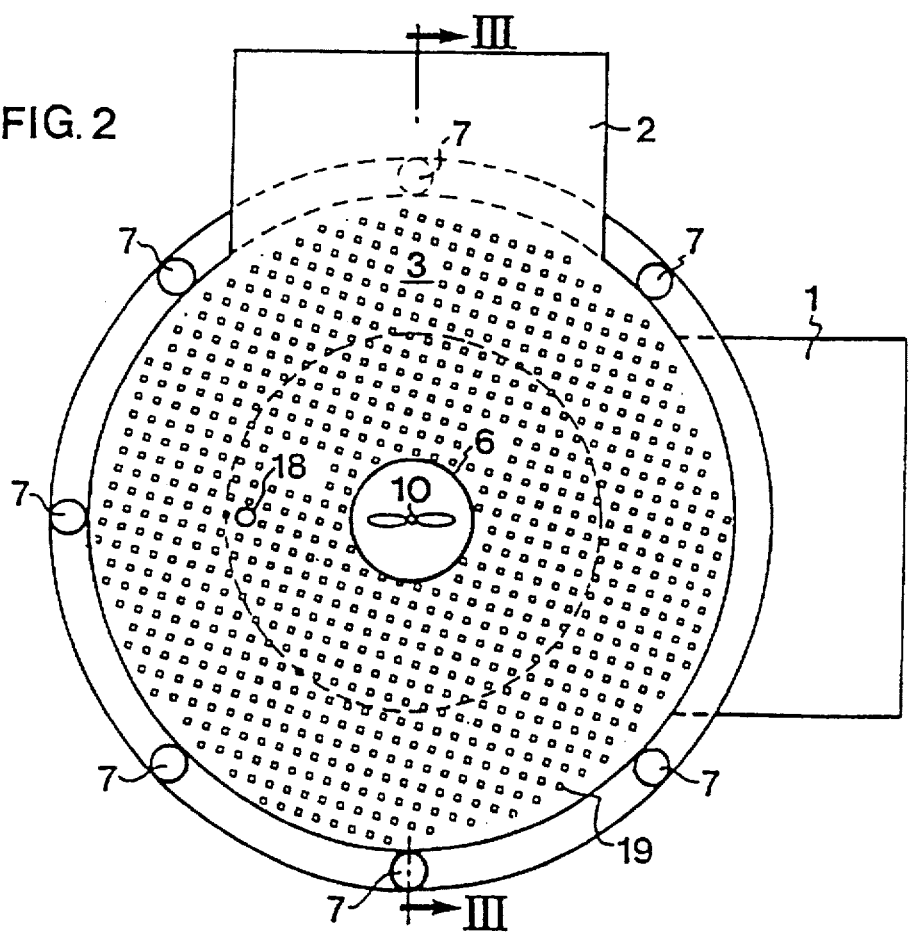
FIG. 2 is a horizontal section of the device in FIG. 1 taken along line II—II.
Figure 3:
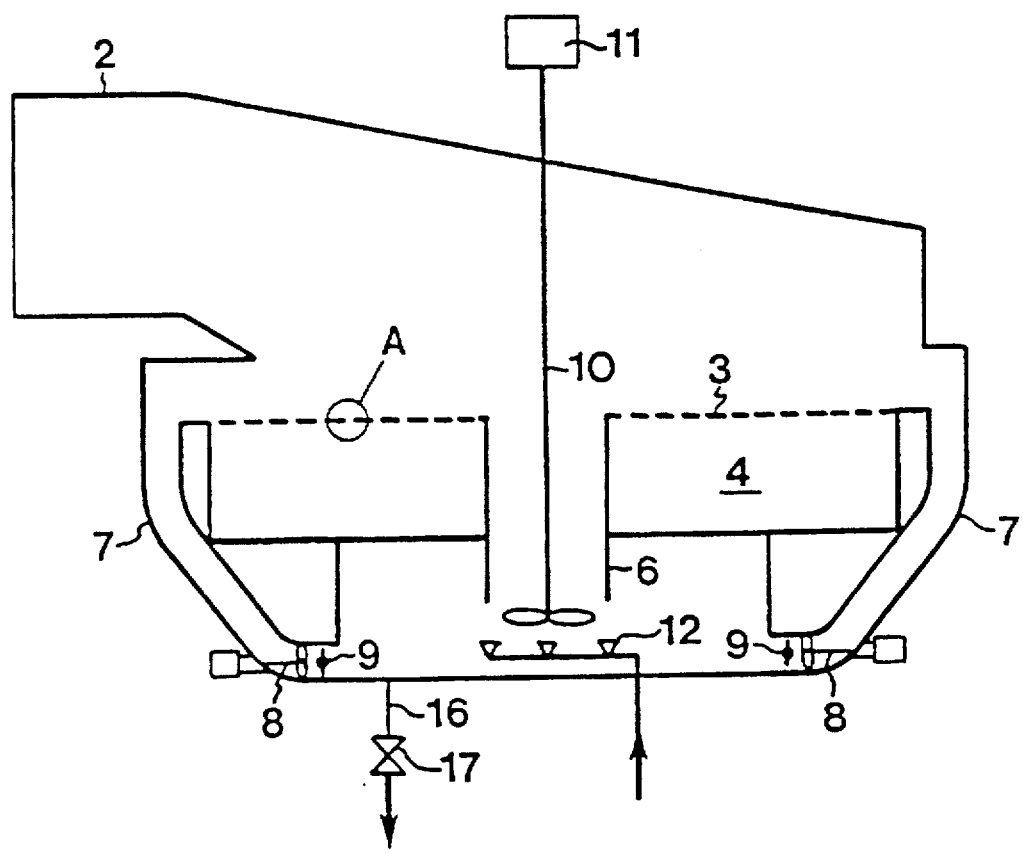
FIG. 3 is a lateral section of the device in FIG. 1 taken along line III—III in FIG. 2.

The preferred embodiment shown in FIGS. 1–3 has an inlet 1 for sulphur-dioxide-containing gas, such as flue gas from an oil-fired power station, and an outlet 2 for gas cleaned of sulphur dioxide. As is especially evident in FIG. 2, the device has a circular horizontal section and comprises an apertured plate or sieve plate 3, through which the sulphur-dioxide-containing gas flows from below, arranged between the gas inlet 1 and the gas outlet 2. As mentioned in the foregoing, the apertured plate 3 suitably has a free aperture area of about 1–20%, preferably about 1–10%, and most preferred about 3–5%. Below the apertured plate 3, there is a chamber 4 for the sulphur-dioxide-containing gas supplied, and below the chamber 4, there is a tank 5 for the absorbent suspension. At the centre of the tank 5, there is provided a cylindrical inlet duct 6 extending upwards through the chamber 4 and up to the apertured plate 3, thus connecting the tank 5 to the upper side of the apertured plate 3. The cylindrical inlet duct 6 is intended to conduct absorbent suspension from the tank 5 to the apertured plate 3. The device illustrated in FIGS. 1–3 further has a number of peripheral outlet ducts 7 connecting the upper side of the apertured plate 3 to the tank 5 in order to recycle absorbent suspension to the tank. The device further has means for feeding the absorbent suspension from the tank 5, through the upward inlet duct and to the upper side of the apertured plate 3. In the currently most preferred embodiment of the invention, this means comprises impeller 8 disposed in the lower region of each outlet duct, as appears especially from FIGS. 1 and 3. In addition, the device has means for supplying an oxygen-containing gas, such as air. In the most preferred embodiment, these means consist of nozzles 9 disposed downstream from the impeller 8 in each outlet duct. Alternatively, or as a complement to the impeller 8 and the air nozzles 9, an impeller 10 with a motor 11 can be arranged in the circular inlet duct 6, while air-injection nozzles 12 can be arranged in the lower region of the inlet duct 6. If the injection of air is sufficiently powerful, the impeller 8 may optionally be dispensed with. Also the impeller 10 may optionally be dispensed with. If so, the air-injection nozzles provide not only the supply of oxygen-containing gas but the circulation of absorbent suspension by mammoth pump action. These air-injection nozzles consist of the nozzles 9 and/or 12 and may, if need be, be supplemented with additional air-injection nozzles (not shown) distributed over the bottom periphery of the tank 5.

In this embodiment, the means mentioned above under item e) for feeding the absorbent suspension and the means mentioned above under item g) for supplying the oxygen-containing gas form a single common means, which not only supplies the oxygen-containing gas (air) but feeds the absorbent suspension by mammoth pump action. This is feasible owing to the compact design of the inventive device, in which the tank 5 arranged below the apertured plate 3 is so close to the plate that the lifting height of the absorbent suspension from the tank to the apertured plate is about 5 m at the most, preferably about 2 m at the most, normally about 0.5–2 m, and most preferred about 0.2–1 m. It will be appreciated that an inventive device in which the absorbent suspension is circulated by mammoth pump action only is of simple design and does not require much energy for lifting and circulating the absorbent suspension. Consequently, such a device is advantageous in economic terms.

Apart from the means for feeding the absorbent suspension and supplying the oxygen-containing gas, the device comprises means 13 for supplying the absorbent, means 14 for supplying water and, optionally, means 15 for supplying a pH-adjusting agent, as indicated by the arrows in FIG. 1. The absorbent is conveniently supplied in the form of an approximately 20–25% by weight slurry of limestone powder in water. Preferably, the water supplied by the means 14 is water recycled from the dewatering of the precipitated gypsum. The pH stabiliser supplied by the means 15 normally does not have to be supplied in the inventive method, but a certain amount thereof has a buffer effect, which increases the $SO_2$ separation. The pH stabiliser may, for instance, be an acid, such as adipic acid, supplied by the means 15.

The gypsum precipitated in the inventive method accumulates in the tank 5 and is drawn off via a drain conduit 16 equipped with a shut-off valve 17.

In order to avoid the formation of an air gap in the tank 5 below the chamber 4, there are provided one or more ventilating tubes 18 for discharging oxygen-containing gas (air).

Figure 4:
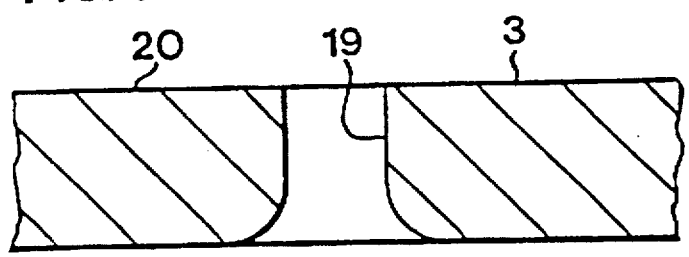
FIG. 4 is an enlarged, partial lateral section of the area A in FIG. 3.

FIG. 4 is an enlarged, partial lateral section of a preferred embodiment of the apertured plate according to the invention, more specifically a section of the area A in FIG. 3. It has been found that further advantageous effects are obtained if the apertured plate is designed as indicated in FIG. 4. As appears from FIG. 4, the apertured plate 3 has a flat and smooth upper surface 20 enabling and facilitating effective cleaning from above. Furthermore, the apertures 19 are gently rounded at the lower openings 21 forming inlet openings for the gas flowing upwards. The edges at the lower openings 21 are so rounded that their radius of curvature is about 5–50 mm, preferably about 5–20 mm, and most preferred about 10 mm. The rounding at the lower opening 21 of the apertures 19 reduces the entrance losses of the gas and contributes to an even distribution of the gas over the entire apertured plate 3.

Apart from the special rounded shape of the apertures 19, the apertured plate 3 should have a certain minimum thickness in order to stabilise the expanded layer of absorbent suspension on the apertured plate 3 and counteract leakage through the plate. It has thus been found that the apertured plate should have a thickness of about 5–50 mm, preferably about 20–50 mm and most preferred about 20–40 mm, for instance about 30 mm.

Basically, the apertured plate 3 can be made of any suitable material having enough dimensional stability to carry the layer of absorbent suspension and being temperature-resistant enough to stand the temperatures involved. The apertured plate 3 is preferably made of plastic material, which is easy to process and has a low surface energy, thus counteracting incrustation. Polypropylene is a preferred plastic material.

The apertured plate may also be made of composite material, such as metal coated with a superficial layer of plastic material, for instance polytetrafluoroethylene.

The apertures 19, which are square in FIG. 2, may have any suitable shape and e.g. be round, square or elongate. However, it is preferred that the apertures are round and have a diameter of about 10–100 mm, preferably about 20–50 mm.

It should here be mentioned that, even though horizontally arranged in the Figures, the apertured plate 3 need not be exactly horizontal but may be slightly inclined, preferably about 300 at the most, in relation to the horizontal plane. Thus, the apertured plate 3 may, for instance, be slightly inclined downwards or be sloping (counting from the inlet for the absorbing suspension), which in the device illustrated in FIGS. 1–4 would mean that the apertured plate slopes downwards from the inlet 6 towards the outlet ducts 7. Such an inclination may contribute to the circulation of the absorbent suspension along the apertured plate.

The invention will now be further elucidated with the aid of an illustrative Example.

EXAMPLE

This Example concerns a device of the type described above in association with FIGS. 1–3. The apertured plate, which was made of polypropylene, had a thickness of about 30 mm and a free aperture area of about 3.6%. The apertures had a diameter of 22 mm and rounded lower edges of the type shown in FIG. 4. The absorbent used was limestone having such a particle size that about 96% thereof passed a sieve having a mesh width of 44 μm. The absorbent was supplied to the tank in the form of a 25% by weight aqueous suspension. The absorbent suspension in the tank contained about 13% by weight of solids and had a pH of about 4.5.

Flue gas from an oil-fired power station was cleaned, the supplied flue gas having a sulphur-dioxide concentration of 732 ppm and a temperature of 191° C. Before being introduced into the device, the flue gas was saturated with moisture.

By means of impellers arranged in the outlet ducts, the absorbent suspension was circulated in the device, from the tank and through the cylindrical inlet ducts, so as to flow radially outwards over the apertured plate, and was then recycled through the outlet ducts down to the tank. Air was injected by means of nozzles arranged after the impellers in such an amount that the molar ratio of O to $SO_2$ was 25.6:1, while the molar ratio of $CaCO_3$ to $SO_2$ was 1.02:1. When fed over the apertured plate, the absorbent suspension formed a layer having a static height of 510 mm and an unexpanded (static) volume of about 730 l. The sulphur-dioxide-containing flue gas was supplied to the device at a flow rate of about 2.5 m³/s and conducted upwards through the apertured plate at a velocity of about 38 m/s. Upon the passage of the sulphur-dioxide-containing flue gas, the layer of absorbent suspension on the apertured plate expanded to a height of about 1100 mm. The flue-gas flow rate through the absorbent suspension amounted to about 290 l/m³.s, i.e. 1 m³ of flue gas passed through 290 l of absorbent suspension per second. In addition, the absorbent suspension flowed over the apertured plate at a flow rate of 12.1 l/s (L/G), calculated on the static volume through which flowed 1 m³ of sulphur-dioxide-containing gas per second. The content of sulphite ions ($SO_3^{2-}$) and hydrogen-sulphite ions ($HSO_3^-$) of the absorbent suspension was found to be less than 10 ppm, i.e. there was no risk of any undesirable precipitation of calcium sulphite. The departing flue gas had a temperature of about 55° C., and its sulphur dioxide content was about 7 ppm, i.e. the degree of separation of sulphur dioxide was 99.0%.

The inventive device shown in the drawings and described above has a circular cross-section. It is, however, to be understood that the inventive device is not restricted to this design, but that a number of other designs are conceivable. Thus, the device may, for instance, have a square cross-section, in which case the inlet duct 6 has an elongate, rectangular cross-section and the one long side of the inlet duct adjoins a rectangular apertured plate. The absorbent suspension then flows from the inlet duct, across the apertured plate and down into an outlet duct on the opposite side of the apertured plate to be recycled to a tank supplying absorbent suspension to the inlet duct. Owing to the rectangular design, two or more units comprising an inlet duct, an apertured plate and an outlet duct may be joined to form a single, compact unit.

As appears from the above description of the invention and the preferred embodiment thereof, the invention has a number of advantages over the prior art. The invention is especially distinguished by the cross-flow relationship between the gas flow and the absorbent suspension which, in combination with the design of the inventive device, enables a minimisation of the energy consumption on the liquid side, i.e. of the energy spent for feeding the absorbent suspension to the contact zone for the gas to be cleaned. In the preferred embodiment of the invention described above, the different components on the absorbent-suspension side (tank, inlet, liquid layer on the apertured plate, and outlet) communicate in the manner of "communicating vessels". By impellers arranged in the tank or by the above-mentioned mammoth effect, the absorbent suspension is caused to rise in the inlet duct and flow out over the apertured plate, thereby initiating and maintaining the circulation of the suspension. From the inlet, the suspension flows over the apertured plate and is recycled to the tank via the outlet ducts. Combined with the compact design involving the storage tank for the absorbent suspension disposed close to the contact zone for the gas and the absorbent suspension, the cross-flow relationship entails that the invention merely requires energy corresponding to the lifting height of a water column of no more than about 5 m, normally about 0.5–2 m, for circulating the absorbent suspension. This is to be compared with the water column of about 20–40 m required according to the prior art, to which is added the energy, corresponding to a water column of about 10 m, required for the pressure in the spray nozzles. In view hereof, the present invention represents a considerable improvement in the field.

We claim:

1. A method for removing sulphur dioxide from a gas, such as a flue gas, by means of an aqueous suspension of an absorbent selected from lime and limestone, characterised in that the sulphur dioxide-containing gas is conducted through a conduit topped with an apertured plate sealed to the walls of the reactor, on which is provided a flowing layer of the absorbent suspension, said layer having a static height of at least about 100 mm and a static volume of about 50–500 l per m³ of sulphur-dioxide-containing gas flowing through the layer every second, and that the layer of absorbent suspension flows radially across the apertured plate at a flow rate of about 5–100 l/s per 1 m³ of sulphur-dioxide-containing gas per second injecting an oxygen containing gas into the absorbent solution at at least one location beneath said conduit, and allowing any excess oxygen containing gas to vent through at least one ventilation tube, which allows passage of the air from the absorbent solution, through the conduit through which the sulphur dioxide containing gas flows and to the space above the absorbent suspension that flows radially across the apertured plate, thereby avoiding air gaps in the absorbent solution beneath the conduit.

2. A method as set forth in claim 1, characterised in that the static height of the layer of absorbent suspension is about 200–500 mm.

3. A method as set forth in claim 1, characterised in that the layer of absorbent suspension flows radially across the apertured plate at a flow rate of about 10–50 l/s.

4. A method as set forth in claim 1, characterised in that the absorbent suspension contains 5–20% by weight, preferably about 10–15% by weight, of gypsum crystals.

5. A device for removing sulphur dioxide from a gas, such as a flue gas, by means of an aqueous suspension of an absorbent selected from lime and limestone, characterised in that it comprises
   a) an inlet (1) for sulphur-dioxide-containing gas, and an outlet (2) for gas from which sulphur dioxide has been removed,
   b) a conduit topped with an apertured plate (3) provided between the inlet (1) and the outlet (2) to permit the passage of sulphur-dioxide-containing gas from below, said apertured plate being sealed to the walls of the reactor and carrying thereon a radially flowing layer of the absorbent suspension having a static height of at least about 100 mm and a static volume of about 50–500 l per $m^3$ of sulphur-dioxide-containing gas flowing through the layer every second,
   c) a tank (5) for the absorbent suspension,
   d) at least one inlet duct (6) connecting the tank (5) to the upper side of the apertured plate (3),
   e) means (8, 10, 11, 12) for feeding absorbent suspension from the tank (5), through inlet duct (6), to the upper side of the apertured plate (3) and radially along the plate at a flow rate of about 5–100 l/s per 1 $m^3$ of sulphur-dioxide-containing gas per second,
   f) at least one outlet duct (7) connecting the upper side of the apertured plate (3) to the tank (5) for recycling absorbent suspension to the tank (5),
   g) means (9, 12) for supplying an oxygen-containing gas,
   h) means (13) for supplying absorbent,
   i) means (14) for supplying water, and
   j) means (16) for withdrawing gypsum.

6. A device as set forth in claim 5, characterised in that the means e) comprises a impeller pump (8) disposed in the lower region of each outlet duct (7).

7. A device as set forth in claim 5, characterised in that the means e) and g) comprise air-injection nozzles (9, 12) for oxygen supply.

8. A device as set forth in claim 5, characterised in that it has an essentially circular cross-section and comprises a centrally-arranged inlet duct (6) of circular cross-section, and at least one outlet duct (7) arranged at the periphery of the device and connecting the upper side of the apertured plate (3) to the tank (5).

9. A device as set forth in claim 5, characterised in that the apertured plate (3), has a free aperture area of about 1–20%, preferably about 1–10%.

10. A device as set forth in claim 5, characterised in that the apertured plate (3) has apertures (19), whose edges are rounded on the underside, having a radius of curvature of about 5–50 mm.

11. A method as set forth in claim 2, characterized in that the layer of absorbent suspension flows radially across the apertured plate at a flow rate of about 10–50 l/s.

12. A method as set forth in claim 2, characterized in that the absorbent suspension contains 5–20% by weight, preferably about 10–15% by weight, of gypsum crystals.

13. A method as set forth in claim 3, characterized in that the absorbent suspension contains 5–20% by weight, preferably about 10–15% by weight, of gypsum crystals.

14. A method as set forth in claim 11, characterized in that the absorbent suspension contains 5–20% by weight, preferably about 10–15% by weight, of gypsum crystals.

15. A device as set forth in claim 6, characterized in that it has an essentially circular cross-section and comprises a centrally-arranged inlet duct (6) of circular cross-section, and at least one outlet duct (7) arranged at the periphery of the device and connecting the upper side of the apertured plate (3) to the tank (5).

16. A device as set forth in claim 7, characterized in that it has an essentially circular cross-section and comprises a centrally-arranged inlet duct (6) of circular cross-section, and at least one outlet duct (7) arranged at the periphery of the device and connecting the upper side of the apertured plate (3) to the tank (5).

17. A device as set forth in claim 6, characterized in that the apertured plate (3) has a free aperture area of about 1–20%, preferably about 1–10%.

18. A device as set forth in claim 7, characterized in that the apertured plate (3) has a free aperture area of about 1–20%, preferably about 1–10%.

19. A device as set forth in claim 8, characterized in that the apertured plate (3) has a free aperture area of about 1–20%, preferably about 1–10%.

20. A device as set forth in claim 6, characterized in that the apertured plate (3) has apertures (19), whose edges are rounded on the underside, having a radius of curvature of about 5–50 mm.

21. A device as set forth in claim 7, characterized in that the apertured plate (3) has apertures (19), whose edges are rounded on the underside, having a radius of curvature of about 5–50 mm.

22. A device as set forth in claim 8, characterized in that the apertured plate (3) has apertures (19), whose edges are rounded on the underside, having a radius of curvature of about 5–50 mm.

23. A device as set forth in claim 9, characterized in that the apertured plate (3) has apertures (19), whose edges are rounded on the underside, having a radius of curvature of about 5–50 mm.

* * * * *